US009080044B2

(12) United States Patent
Muto

(10) Patent No.: US 9,080,044 B2
(45) Date of Patent: Jul. 14, 2015

(54) RUBBER STOPPER FOR MEDICAL TREATMENT

(71) Applicant: Fumihiro Muto, Mie (JP)

(72) Inventor: Fumihiro Muto, Mie (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 76 days.

(21) Appl. No.: 13/727,347

(22) Filed: Dec. 26, 2012

(65) Prior Publication Data

US 2013/0116648 A1    May 9, 2013

Related U.S. Application Data

(63) Continuation of application No. PCT/JP2011/064161, filed on Jun. 21, 2011.

(30) Foreign Application Priority Data

Jun. 22, 2010  (JP) ................................. 2010-141766

(51) Int. Cl.
| C08L 47/00 | (2006.01) |
| C08L 53/02 | (2006.01) |
| A61J 1/14 | (2006.01) |
| B65D 51/00 | (2006.01) |
| C08L 23/12 | (2006.01) |

(52) U.S. Cl.
CPC .............. *C08L 47/00* (2013.01); *A61J 1/1412* (2013.01); *B65D 51/002* (2013.01); *C08L 53/025* (2013.01); *C08L 23/12* (2013.01)

(58) Field of Classification Search
CPC ............................... C08L 47/00; A61J 1/1412
USPC ................................... 524/502, 525; 604/408
See application file for complete search history.

(56) References Cited

U.S. PATENT DOCUMENTS 6,140,418  A    10/2000  Yamashita et al.

FOREIGN PATENT DOCUMENTS

| CN | 101486818 A | 7/2009 |
| CN | 101664367 A | 3/2010 |
| JP | 05-059287 | 3/1993 |
| JP | 05-059287 A | 3/1993 |
| JP | 07-228749 | 8/1995 |
| JP | 07-228749 A | 8/1995 |
| JP | 09-000601 | 1/1997 |
| JP | 09-000601 A | 1/1997 |
| JP | 2001-258991 | 9/2001 |
| JP | 2001-258991 A | 9/2001 |
| JP | 2002-143270 A | 5/2002 |
| JP | 2003-012887 | 1/2003 |
| JP | 2003-012887 A | 1/2003 |
| JP | 2003-277575 A | 10/2003 |
| JP | 2007-050138 | * 3/2007 |
| JP | 2007-169436 | * 7/2007 |
| JP | 2007-169436 A | 7/2007 |
| JP | 2008-264242 | 11/2008 |
| JP | 2008-264242 A | 11/2008 |
| JP | 2009-072250 | 4/2009 |
| JP | 2009-072250 A | 4/2009 |
| JP | 2010-126612 A | 6/2010 |
| JP | 2010-126636 A | 6/2010 |

OTHER PUBLICATIONS

Combined Office Action and Search Report issued Apr. 17, 2014 in Chinese Patent Application No. 201180022167.2 with English language translation.
Office Action issued May 20, 2014 in Japanese Patent Application No. 2011-138539 (with English language translation).
Information Offer Form issued Jul. 22, 2014 in Japanese Patent Application No. 2011-138539 (with English language translation).
International Search Report issued Aug. 16, 2011 in PCT/JP2011/064161 filed Jun. 21, 2011.

* cited by examiner

*Primary Examiner* — James J Seidleck
*Assistant Examiner* — Deve E Valdez
(74) *Attorney, Agent, or Firm* — Oblon, McClelland, Maier & Neustadt, L.L.P.

(57) ABSTRACT

This invention is a rubber stopper for medical treatment, which is obtained by molding a resin composition containing a component (A): at least one of a block copolymer having at least two of a polymer block P containing a vinyl aromatic compound as the core and at least one of a polymer block Q containing a conjugated diene as the core and a hydrogenated block copolymer thereof, a component (B): a hydrocarbon-based softening agent for rubbers, and a component (C): a polyolefin-based resin, wherein the resin composition contains a specified amount of the component (C) based on the total amount of the component (A) and the component (B), and the resin composition has a specified molecular weight distribution.

9 Claims, 1 Drawing Sheet

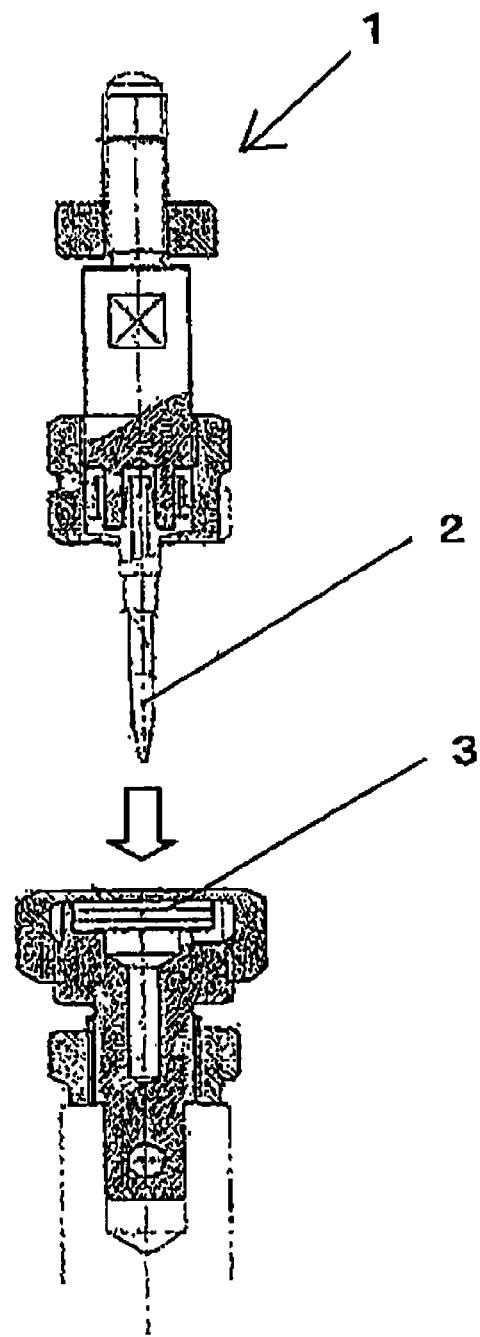

RUBBER STOPPER FOR MEDICAL TREATMENT

CROSS REFERENCE TO RELATED APPLICATION

This application is a continuation of PCT application No. PCT/JP2011/064161, which was filed on Jun. 21, 2011 based on Japanese Patent Application (Application No. 2010-141766) filed on Jun. 22, 2010, the contents of which are incorporated herein by reference. Also, all the references cited herein are incorporated as a whole.

TECHNICAL FIELD

This invention relates to a rubber stopper for medical treatment which is obtained by molding a resin composition. Particularly, the invention relates to a rubber stopper for medical treatment which is excellent in needle pricking characteristics and also favorable in liquid leakage sealing property, sterilization stability and molding workability.

BACKGROUND ART

The infusion bag means a container which is used in injecting a liquid such as a blood preparation, drip infusion liquid and the like to a living body or in preserving them. Currently, glass make, plastic make and the like are used in the infusion bag, and a rubber stopper is inter-fitted to the opening of the container in order to prevent leakage of the liquid (containing liquid) filled therein. In using the infusion bag, it is general that an injection needle such as a metal needle, a plastic needle and the like is inserted into the rubber stopper and the containing liquid is pulled out through it.

In the above-mentioned use, the injection needle is pulled out from the rubber stopper at a period of time in response to each treatment, which is not only pulled out after complete consumption of the containing liquid but also pulled out under a state of remaining the containing liquid in the infusion bag. The characteristic required for the rubber stopper in that case is the liquid leakage sealing property. When this sealing property is insufficient, there is a case of causing leakage or scattering of the containing liquid from a hole formed where the injection needle is inserted.

Conventionally, a vulcanized rubber having excellent liquid leakage sealing property, such as an isoprene rubber, is frequently used in the rubber stopper for infusion bag, but not only the vulcanized rubber contains an additive agent which is not suited for articles for clinical use but also is inferior in terms of molding workability. In addition, while the main stream of infusion bag is from glass make to plastics make, it is possible to carry out fusion inter-fit with the main body of a plastic infusion bag made by a two-color molding, so that an attempt has been made to use rubber stoppers made of thermoplastic elastomers (Patent Document 1).

Since styrene-based elastomers are particularly excellent in rubber elasticity, these have been examined as the materials from which vulcanized rubber substitution is highly expected, and it has been disclosed that a styrene-based elastomer having a specified hardness range is excellent in the balance of liquid leakage sealing property, penetration strength and handling property (Patent Document 2).

Further, it has been disclosed that a styrene-based elastomer containing isoprene having a 1,4-microstructure expresses high liquid leakage sealing property (Patent Document 3). In addition, a technique of adding a petroleum resin has also been disclosed (Patent Document 4).

PRIOR ART LITERATURE

Patent Documents

Patent Document 1: JP-A-5-59287
Patent Document 2: JP-A-7-228749
Patent Document 3: JP-A-9-601
Patent Document 4: JP-A-2007-169436

SUMMARY OF THE INVENTION

Problems that the Invention is to Solve

However, though each of these related arts has a relatively good performance regarding the liquid leakage sealing property on the assumption that it is used for a short period of time of penetrating the needle, it has been revealed that it does not show sufficient liquid leakage sealing when the needle is kept under a state of penetrating for a prolonged period of time and then the needle is pulled out. Thus, in order to compensate the insufficient liquid leakage sealing property, it is general that the rubber stopper made of a thermoplastic elastomer is formed thicker than the rubber stopper made of a vulcanized rubber.

By the way, as the injection needle to be used in pulling out the containing liquid of an infusion bag, a metal needle (needle made of a metal) was conventionally general, but it is now active to replace the metal needle with a plastic needle (needle made of a resin). This is because the infusion set other than the injection needle, such as infusion bag, tubes and the like, is made of plastics so that it is not necessary to separately discard the injection needle when replaced with a plastics manufacture and its discard therefore is convenient. In addition, since it is not necessary to separately discard the injection needle, there is case that a separator pricks the skin by mistake, which is desirable from the viewpoint of improving safety, too.

However, since the plastic needle has low rigidity in comparison with the metal needle, it is necessary to enlarge diameter of the needle when wanted to ensure similar strength but, accompanied thereby, the resistance when the needle is penetrated through the rubber stopper (penetration resistance) becomes large. Since the rubber stopper made of a vulcanized rubber is thin in the molded product thickness, there is no large difficulty even when a plastic needle is used, but it has been strongly desired to lower penetration resistance of the robber stopper made of a thermoplastic elastomer because it is necessary to thicken the molded product as described in the forgoing. In addition to this, currently, the main body of the infusion bag made of a plastic also has a tendency of becoming thin, but when penetration resistance of the rubber stopper is high, it is concerned that the main body of the infusion bag is twisted due to a difficulty in smoothly penetrating the injection needle. Also, due to enlargement of the needle diameter, further high performance is required regarding the liquid leakage sealing property.

Because of this, improvement of the liquid leakage sealing property and penetration resistance of the rubber stopper made of a thermoplastic elastomer is in pressing need but has not been achieved yet.

The invention has been made by taking such background arts into consideration, and its problem is to provide a rubber stopper for medical treatment which is excellent in needle pricking characteristics and has proper liquid leakage sealing property and sterilization stability and the like.

Means for Solving the Problems

Taking the above-mentioned problems into consideration, the inventors have conducted intensive studies and found as a result that a thermoplastic elastomer prepared by using a block copolymer having specified chemical structure/and molecular weight distribution as a component and by further blending specified amounts of a polyolefin-based resin and a hydrocarbon-based softening agent for rubbers can resolve all of the conventional problems by expressing high performance as a rubber stopper for infusion bag, thus accomplishing the invention.

That is, the invention takes the following [1] to [11] as the gist.

[1] A rubber stopper for medical treatment, which is obtained by molding a resin composition containing
component (A): at least one of a block copolymer having at least two of a polymer block P containing a vinyl aromatic compound as the core and at least one of a polymer block Q containing a conjugated diene as the core and a hydrogenated block copolymer obtained by hydrogenating the block copolymer.
component (B): a hydrocarbon-based softening agent for rubbers, and
component (C): a polyolefin-based resin, wherein
containing amount of the component (C) in the resin composition is from 1 weight part to 45 weight parts based on 100 weight parts in total of from 5 weight parts to 95 weight parts of the component (A) and from 5 weight parts to 95 weight parts of the component (B), and
the resin composition has at least one of one or more peaks and peak shoulders respectively within the ranges of
(A-1) molecular weight: from 250,000 to 350,000
(A-2) molecular weight: from 100,000 to 150,000 on the styrene basis molecular weight by a gel permeation chromatography analysis.

[2] The rubber stopper for medical treatment as described in the above-mentioned [1], wherein the resin composition further has at least one of one or more peaks and peak shoulders respectively within the ranges of
(A-3) molecular weight: from 400,000 to 550,000
(A-4) molecular weight: from 150,000 to 250,000 on the styrene basis molecular weight by a gel permeation chromatography analysis.

[3] A rubber stopper for medical treatment, which is obtained by molding a resin composition containing
component (A): at least one of a block copolymer having at least two of a polymer block P containing a vinyl aromatic compound as the core and at least one of a polymer block Q containing a conjugated diene as the core and a hydrogenated block copolymer obtained by hydrogenating the block copolymer.
component (B): a hydrocarbon-based softening agent for rubbers, and
component (C): a polyolefin-based resin, wherein
containing amount of the component (C) in the resin composition is from 1 weight part to 45 weight parts based on 100 weight parts in total of from 5 weight parts to 95 weight parts of the component (A) and from 5 weight parts to 95 weight parts of the component (B), and
the component (A) has at least one of one or more peaks and peak shoulders respectively within the ranges of
(A-1) molecular weight: from 250,000 to 350,000
(A-2) molecular weight: from 100,000 to 150,000 on the styrene basis molecular weight by a gel permeation chromatography analysis.

[4] The rubber stopper for medical treatment as described in the above-mentioned [3], wherein the component (A) further has at least one of one or more peaks and peak shoulders respectively within the ranges of
(A-3) molecular weight: from 400,000 to 550,000
(A-4) molecular weight: from 150,000 to 250,000 on the styrene basis molecular weight by a gel permeation chromatography analysis.

[5] The rubber stopper for medical treatment as described in any one of the above-mentioned [1] to [4], wherein a peak signal intensity ratio of a peak presenting within the range of (A-1) and a peak presenting within the range of (A-2) obtained by peak separation, [A-1/A-2], is from 25/75 to 95/5.

[6] The rubber stopper for medical treatment as described in any one of the above-mentioned [1] to [5], wherein the component (A) contains 10% by weight or more of the polymer block P.

[7] The rubber stopper for medical treatment as described in any one of the above-mentioned [1] to [6], wherein the polymer block Q contains isoprene as the conjugated diene and 1,4-addition structure of isoprene in the microstructure of polymer block Q is from 60% by weight to 100% by weight.

[8] The rubber stopper for medical treatment as described in any one of the above-mentioned [1] to [7], wherein the component (B) contains one or more species selected from the group consisting of a paraffin-based oil, a naphthene-based oil and a carbon atom aromatic oil.

[9] The rubber stopper for medical treatment as described in any one of the above-mentioned [1] to [8], wherein the component (C) is a peroxide resoluble type polyolefin-based resin.

[10] The rubber stopper for medical treatment as described in any one of the above-mentioned [1] to [9], which is used for a plastic needle.

[11] An infusion bag, which contains the rubber stopper for medical treatment as described in any one of the above-mentioned [1] to [10].

Advantage of the Invention

According to the invention, there is provided a rubber stopper for medical treatment made of a thermoplastic elastomer, which easily undergoes needle pricking and is excellent in rubber stopper fitness such as liquid leakage sealing property. By applying the rubber stopper for medical treatment of the invention to an infusion bag, there is provided a rubber stopper for infusion bag, in which substitution of vulcanized rubbers is possible and productivity and hygiene are improved in comparison with rubber stoppers made of the conventional vulcanized rubbers.

In addition, since the rubber stopper for medical treatment of the invention can easily undergo needle pricking even when a plastic needle is used and is excellent in liquid leakage sealing property, it becomes possible to discard it as an infusion set of whole plastic product. Because of this, there is provided a rubber stopper for medical treatment which is also excellent in view of environment and in view of safety.

BRIEF DESCRIPTION OF THE DRAWING

FIG. 1 is a sectional view of a jig used in Examples for evaluating penetration characteristics.

MODE FOR CARRYING OUT THE INVENTION

The following describes the invention in detail, but the invention is not limited to the following descriptions and can be carried out through optional modifications within a scope of not departing the gist of the invention.

The rubber stopper for medical treatment of the invention is obtained by molding a resin composition which contains at least the following components (A), (B) and (C).

<Component (A)>

The component (A) concerned in the invention contains a block copolymer having at least two of a polymer block P containing a vinyl aromatic compound as the core and at least one of a polymer block Q containing a conjugated diene as the core and a hydrogenated block copolymer obtained by hydrogenating the block copolymer. The component (A) contains at least one of the above-mentioned block copolymer and hydrogenated block copolymer.

In this case, the "polymer which contains a vinyl aromatic compound as the core" means a product of polymerizing monomers containing a vinyl aromatic compound as the core, and the "polymer which contains a conjugated diene as the core" means a product of polymerizing monomers containing a conjugated diene as the core. Also, the term "as the core" in the invention means that it is 50% by mol or more.

The vinyl aromatic compound as the monomer which constitutes the polymer block P (to be referred also to as "block P" hereinafter) is not limited, but a styrene derivative such as styrene, α-methylstyrene and the like is desirable. Particularly, it is desirable to use styrene as the core. In this connection, the block P may contain a monomer other than the vinyl aromatic compound as a material.

The conjugated diene as the monomer which constitutes the polymer block Q (to be referred also to as "block Q" hereinafter) is not limited, but it is desirable that it contains at least one of butadiene and isoprene as the core, of which butadiene and isoprene are more desirable. In this connection, the block Q may contain a monomer other than the conjugated diene as a material.

The block Q may be a hydrogenated derivative in which the double bonds presenting after polymerization are hydrogenated. Hydrogenation ratio of the block Q is not limited but is preferably from 80% by weight to 100% by weight and more preferably from 90% by weight to 100% by weight. When the block Q is hydrogenated within the aforementioned range, adhesive property of the obtained resin composition is lowered and its elastic property is increased, so that the characteristics proper as the rubber stopper for medical treatment can be obtained. In this connection, these are the same when the block P uses a diene component as the material. The hydrogenation ratio can be measured by a $^{13}$C-NMR.

When the block Q is a hydrogenation derivative and constituted from butadiene as the core, it is desirable that 1,4-addition structure of butadiene in the microstructure of block Q is from 20% by weight to 100% by weight. In the same manner, when the block Q is constituted from isoprene, it is desirable that 1,4-addition structure of isoprene in the microstructure of block Q is from 60% by weight to 100% by weight. In each case, by setting the ratio of 1,4-addition structure to the aforementioned range, adhesive property of the obtained resin composition is lowered and its elastic property is increased, so that characteristics favorable as the rubber stopper for medical treatment can be obtained. In this connection, the ratio of 1,4-addition structure can be obtained by a $^{13}$C-NMR.

The component (A) concerned in the invention is not limited, with the proviso that it has a structure having at least two of the polymer block P and at least one of the polymer block Q, and may be any one of a straight chain, a branched chain, a radial and the like, but a case in which it is a block copolymer represented by the following formula (1) or (2). In addition, it is further desirable that the block copolymer represented by the following formula (1) or (2) is a hydrogenated derivative (to be referred sometimes to as "hydrogenated block copolymer" hereinafter). When the copolymer represented by the following formula (1) or (2) is a hydrogenated block copolymer, its thermal stability becomes good.

P-(Q-P)$_m$          (1)

(P-Q)$_n$          (2)

(In the formulae, P represents polymer block P, and Q polymer block Q, respectively, m is an integer of from 1 to 5 and n is an integer of from 2 to 5.)

In the formula (1) or (2), m and n may be large from the viewpoint of lowering order-disorder transition temperature as a rubbery polymer body but may be small in view of easy production and low cost.

When the component (A) is a hydrogenated block copolymer represented by the formula (1) or (2) and the block Q is constituted from butadiene, it is desirable that 1,4-addition structure of butadiene in the microstructure of block Q is from 20% by weight to 70% by weight. In the same manner, when the block Q is constituted from isoprene, it is desirable that 1,4-addition structure of isoprene in the microstructure of block Q is from 60% by weight to 100% by weight. In each case, by setting the ratio of 1,4-addition structure to the aforementioned range, adhesive property of the obtained resin composition is lowered and its elastic property is increased, so that characteristics favorable as the rubber stopper for medical treatment can be obtained.

As the block copolymer or hydrogenated block copolymer (to be referred en bloc to as "(hydrogenated) block copolymer" hereinafter), because of the excellent rubber elasticity, a (hydrogenated) block copolymer represented by the formula (1) is desirable rather than a (hydrogenated) block copolymer represented by the formula (2), and a (hydrogenated) block copolymer represented by the formula (1) wherein m is 3 or less is more desirable and a (hydrogenated) block copolymer represented by the formula (1) wherein m is 2 or less is further desirable.

Though weight ratio of the block P and block Q constituting the component (A) is optional, larger block P is desirable from the viewpoint of mechanical strength and heat fusion strength of the resin composition concerned in the invention but, on the other hand, smaller block P is desirable from the viewpoint of flexibility, profile extrusion molding and bleed out inhibition of the resin composition.

Weight ratio of block P in the component (A) is preferably 10% by weight or more, more preferably 15% by weight or more and particularly preferably 30% by weight or more, on the other hand, it is preferably 60% by weight or less, more preferably 50% by weight or less and particularly preferably 45% by weight or less.

Production method of the component (A) in the invention may be any method and not particularly limited, with the proviso that the above-mentioned structures and physical properties can be obtained. Illustratively, it can be obtained by carrying out block polymerization in an inert solvent using a lithium catalyst and the like by the method described for example in JP-B-40-23798. Also, hydrogen addition (hydrogenation) of the block copolymer can be carried out in an inert solvent in the presence of a hydrogenation catalyst by the methods described for example in JP-B-42-8704, JP-B-43-6636, JP-A-59-133203, JP-A-60-79005 and the like. In this hydrogenation treatment, it is desirable that 50% or more of the olefinic double bonds in the polymer block is hydrogenated and it is further desirable that 80% or more thereof is hydrogenated, also, it is desirable that 25% or less of aromatic unsaturated bonds in the polymer block is hydrogenated.

As commercial items of such a hydrogenated block copolymer, there may be mentioned "KRATON-G" manufactured by Shell Chemicals Japan Ltd., "SEPTON" and "HYBRAR" manufactured by KURARAY CO., LTD., "Tufrec" manufactured by Asahi Chemical Industry Co., Ltd. and the like.

As commercial items of the non-hydrogenation type block copolymers, there may be mentioned "KRATON-A" manufactured by Shell Chemicals Japan Ltd., a partial grade of "HYBRAR" manufactured by KURARAY CO., LTD., "Tufprene" manufactured by Asahi Chemical Industry Co., Ltd. and the like.

Number average molecular weight of the component (A) according to the invention is not limited, but desirably, it is generally 30,000 or more, preferably 50,000 or more and more preferably 80,000 or more, and is generally 500,000 or less, preferably 400,000 or less and more preferably 300,000 or less. When number average molecular weight of the component (A) is within the aforementioned range, moldability and heat resistance are good, which is desirable.

Mass average molecular weight of the component (A) according to the invention is not limited, but desirably, it is generally 60,000 or more, preferably 80,000 or more and more preferably 100,000 or more, and generally 550,000 or less, preferably 500,000 or less and more preferably 400,000 or less. When mass average molecular weight of the component (A) is within the aforementioned range, moldability and heat resistance are good, which is desirable.

The rubber stopper for medical treatment concerned in an invention among the invention is characterized in that the component (A) as a component of the resin composition constituting the rubber stopper for medical treatment has a specified molecular weight distribution.

Illustratively, the component (A) has at least one of one or more peaks and peak shoulders respectively within the ranges of the following (A-1) and (A-2), on the styrene basis molecular weight by a gel permeation chromatography (to be referred sometimes to as "GPC" hereinafter) analysis. Further desirably, it has at least one of one or more peaks and peak shoulders respectively within the ranges of the following (A-1), (A-2) and (A-3), and most desirably, it has at least one of one or more peaks and peak shoulders respectively within the ranges of the following (A-1) to (A-4).
(A-1) molecular weight: from 250,000 to 350,000
(A-2) molecular weight: from 100,000 to 150,000
(A-3) molecular weight: from 400,000 to 550,000
(A-4) molecular weight: from 150,000 to 250,000

In this connection, regarding the (A-4) molecular weight, it does not include boundary molecular weight with (A-1) and boundary molecular weight with (A-2). That is, (A-4) molecular weight means exceeding 150,000 and less than 250,000.

In this case, in isolating GPC peaks of the block copolymer by the Gauss-Newton method, it is possible to isolate peaks having their shoulder parts as the peaks, and the peak shoulders according to the invention means those from which a peak strength of 1/20 or more based on the peak having most high strength is obtained.

In this connection, measuring conditions of the GPC to be used in the invention in measuring molecular weight distribution (number/mass average molecular weight) and separating peaks are as follows.
(Measuring Conditions)
Apparatus: "HLC-8120GPC" manufactured by TOSOH CORP.
Column: "TSKgel Super HM-M" manufactured by TOSOH CORP.
Detector: differential refractometer detector (RI detector/integrated)
Solvent: chloroform
Temperature: 40° C.
Flow rate: 0.5 ml/min
Injection: 20 μL
Concentration: 0.1 wt %
Calibration data: monodispersion polystyrene
Calibration method: polystyrene basis
Calibration curve approximate expression: cubic expression
Peak separation software: "DBFinderSP" manufactured by TOSOH CORP.
Peak isolation method: Gauss-Newton method In addition, it is desirable that peak signal intensity ratio of a peak presenting within the range of (A-1) and a peak presenting within the range of (A-2) obtained by isolating by the Gauss-Newton method, [A-1/A-2], is from 25/75 to 95/5, more desirably from 25/75 to 90/10, further desirably from 25/75 to 85/15.

Thus, by having the aforementioned peak characteristics as the component (A) within the aforementioned molecular weight ranges of from (A-1) to (A-4), a rubber stopper for medical treatment which is excellent in needle pricking characteristics and also favorable in liquid leakage sealing property, sterilization stability and the like can be obtained. Though the cause is not clear, it is guessed that material strength of the component (A) is lowered due to deep compatibility of the component (A) with amorphous part of the component (C) and the penetration strength is suppressed low accompanied thereby, and it is considered that, because of the possession of moderate tackiness and visco-elasticity, the deformation-following property in puling out the needle becomes high so that high liquid leakage sealing property is obtained.

According to the invention, there is no limitation on the means for having at least one of one or more of specific peaks and peak shoulders within the molecular weight ranges of the aforementioned (A-1) to (A-4) as the component (A), and it can be achieved by optimizing the production conditions by the aforementioned production method or it can be achieved by optionally selecting a (hydrogenated) block copolymer from a commercial items and using it. In addition, it can also be achieved by optionally blending and using two or more of manufactured products and commercial items.

Particularly, rather than preparing a resin composition by using two or more (hydrogenated) block copolymers having different molecular weight distributions and blending them with the component (B) and component (C) which are described later, it is desirable to prepare a resin composition by obtaining the component (A) as a (hydrogenated) block copolymer having two or more peaks by the GPC analysis as described in the foregoing and then blending this with the component (B) and component (C) which are described later.

In the resin composition which constitutes the rubber stopper for medical treatment of the invention, the component (A) is generally 5 parts by weight or more, preferably 25 parts by weight or more and more preferably 30 parts by weight or more, and generally 95 parts by weight or less and preferably 80 parts by weight or less, based on the total (100 parts by weight) of the component (A) and the component (B) which is described later. In the same manner, the component (B) is generally 5 parts by weight or more and preferably 20 parts by weight or more and generally 95 parts by weight or less, preferably 75 parts by weight or less and more preferably 70 parts by weight or less.

In addition, when the substance having at least one of the specific peaks and peak shoulders within the aforementioned molecular weight ranges of (A-1) and (A-2) is used as the component (A), the component (A) having at least one of the specific peaks and shoulders is generally 5 weight parts or more, preferably 10 weight parts or more and more preferably 15 weight parts or more and generally 95 weight parts or less, preferably 90 weight parts or less and more preferably 85 weight parts or less, based on the total (100 weight parts) of the component (A) having at least one of the specific peaks and shoulders and the component (B). In the same manner, the component (B) is generally 5 weight parts or more, preferably 10 weight parts or more and more preferably 15 weight parts or more and generally 95 weight parts or less, preferably 90 weight parts or less and more preferably 85 weight parts or less.

<Component (B): Hydrocarbon-Based Softening Agent for Rubbers>

According to the invention, a hydrocarbon-based softening agent for rubbers is used as the component (B). As the hydrocarbon-based softening agent for rubbers, due to high affinity for the component (A), a mineral oil-based or synthetic resin-based softening agent is desirable and a mineral oil-based softening agent is more desirable.

The mineral oil-based softening agent is generally a mixture of an aromatic hydrocarbon, a naphthene-based hydrocarbon and a paraffin-based hydrocarbon, and the material in which 50% or more of the total carbon atoms is a paraffin-based hydrocarbon is regarded as paraffin-based oil, and the material in which approximately from 30% to 45% or more of the total carbon atoms is a naphthene-based hydrocarbon as naphthene-based oil, and the material in which 35% or more of the total carbon atoms is an aromatic-based hydrocarbon as carbon atom aromatic-based oil, respectively. As the component (B) concerned in the invention, it is desirable to use any one of those selected from a paraffin-based oil, a naphthene-based oil and a carbon atom aromatic-based oil. Among these, it is more desirable to use a paraffin-based oil because the hue is favorable. As the synthetic resin-based softening agent, polybutene and low molecular weight polybutadiene and the like can be mentioned.

In this connection, as the hydrocarbon-based softening agent for rubbers, any one of the above-mentioned various types of softening agent may be used alone or it may be a mixture of two or more species.

Kinematic viscosity of the hydrocarbon-based softening agent for rubbers at 40° C. is preferably low from the view point of moldability but is desirably high from the viewpoint of hygiene of eluted particulate and the like. Illustratively, it is preferably 20 centistokes or more and more preferably 50 centistokes or more, and, on the other hand, it is preferably 800 centistokes or less and more preferably 600 centistokes or less.

Flash point (COC method) of the hydrocarbon-based softening agent for rubbers id not limited but is preferably 200° C. or more and more preferably 250° C. or more.

<Component (C): Polyolefin-Based Resin>

According to the invention, a polyolefin-based resin is used as the component (C). As the polyolefin-based resin, illustratively, there may be mentioned a low density polyethylene homopolymer, a high density polyethylene homopolymer, an ethylene-α-olefin copolymer, a propylene homopolymer, a propylene-ethylene copolymer, a propylene-1-butene copolymer, a propylene-ethylene-1-butene copolymer, a propylene-4-methyl-1-pentene copolymer, an ethylene-methacrylic acid copolymer and those in which these polymers are modified with an acid anhydride and the like to provide with polar functional groups, and the like. Among these, a peroxide resoluble type polyolefin-based resin is preferable as the component (C), particularly, a propylene-based resin is desirable. In this case, the propylene-based resin means a polymer obtained from a monomer containing propylene as the core, and illustratively, a propylene homopolymer, a propylene-ethylene copolymer, a propylene-1-butene copolymer, a propylene-ethylene-1-butene copolymer and the like are preferable. Among these, a propylene homopolymer is particularly desirable. In this connection, any one of the above-described various polyolefin-based resins may be used alone as the polyolefin-based resin, or it may be a mixture of two or more species.

Melt flow rate (MFR) of the polyolefin-based resin, measured at 230° C. under a load of 2.16 kg in accordance with the Test Condition 4 of JIS K7210 (1999), is preferably large from the viewpoint of moldability but is preferably small in view of mechanical strength. Illustratively, MFR of the polyolefin-based resin at 230° C. under a load of 2.16 kg is preferably 0.1 g/10 min or more and more preferably 1 g/10 min or more, and on the other hand, 50 g/10 min or less is preferable and 30 g/10 min or less is more preferable.

Using amount of the component (C) is from 1 weight part to 45 weight parts based on 100 weight parts in total of the component (A) and component (B). Larger amount of the component (C) is desirable from the viewpoint of blocking inhibition, moldability and the like but smaller amount of the component (C) is desirable from the viewpoint of liquid leakage sealing property and penetration resistance. It is desirable that containing amount of the component (C) is 2 weight parts or more based on 100 weight parts in total of the component (A) and component (B), and on the other hand, 40 weight parts or less is desirable and 25 weight parts or less is more desirable.

<Other Components>

Within a scope of not substantially spoiling the effects of the invention, resins, additive agents and the like other than the above-mentioned components (A) to (C) may be used in the resin composition which constitutes the rubber stopper for medical treatment of the invention.

As the resins other than the components (A) to (C), illustratively, for example, there may be mentioned an ethylene-based copolymer such as an ethylene-vinyl acetate copolymer, an ethylene-acrylic acid copolymer, an ethylene-methacrylic acid copolymer, an ethylene-acrylic acid ester copolymer, an ethylene-methacrylic acid ester copolymer and the like: a polyphenylene ether-based resin: a polyamide-based resin such as nylon 66, nylon 11 and the like: a thermoplastic resin such as a polyester-based resin such as polyethylene terephthalate, polybutylene terephthalate and the like, an acryl/methacryl-based resin such as a polymethyl methacrylate-based resin, and the like.

Also, as the additive agents other than the components (A) to (C), there may be mentioned various types of a heat stabilizer, an oxidation inhibitor, an ultraviolet ray absorbent, an age resistor, a plasticizer, a light stabilizer, a nucleating agent, an impact improver, a pigment, a lubricant, an antistatic agent, a flame retarder, a flame resisting auxiliary, a filler, a compatibilizer, a tackifier and the like. Only one of these other resins, additive agents and the like may be used, or two or more thereof may be concomitantly used with an optional combination and ratio.

As the heat stabilizer and oxidation inhibitor, for example, there may be mentioned hindered phenols, a phosphorus compound, a hindered amine, a sulfur compound, a copper compound, an alkali metal halide and the like.

The flame retarder is roughly divided into a halogen-based flame retarder and a non-halogen-based flame retarder, and a non-halogen-based flame retarder is desirable from the viewpoint of environment. As the non-halogen-based flame retarder, there may be mentioned a phosphorus-based flame retarder, a hydrated metal compound (aluminum hydroxide, magnesium hydroxide) flame retarder, a nitrogen-containing compound (melamine-based, guanidine-based) flame retarder, an inorganic-based compound (a borate, a molybdenum compound) flame retarder and the like.

The filler is roughly divided into organic fillers and inorganic fillers. As the organic fillers, there may be mentioned a natural origin polymer such as starch, cellulose particulate, wood flower, bean-curd refuse, rice hulls, wheat bran and the like and modified products thereof. Also, as the inorganic fillers, there may be mentioned talc, calcium carbonate, zinc carbonate, Wollastonite, silica, alumina, magnesium oxide, calcium silicate, sodium aluminate, calcium aluminate, sodium aluminosilicate, magnesium silicate, Glass balloon, carbon black, zinc oxide, antimony trioxide, zeolite, hydrotalcite, metallic fiber, metallic whisker, ceramic whisker, potassium titanate, boron nitride, graphite, carbon fiber and the like.

When the resins and components other than the components (A) to (C) are used in the production of the rubber stopper for infusion bag of the invention, total amount of the components (A) to (C) in the materials of the rubber stopper for infusion bag of the invention is preferably 60% by weight or more and more preferably 80% by weight of the resin composition, from the viewpoint of easy expression and the like of the excellent effects of the invention. In this connection, the upper limit in this case is generally 100% by weight.

<Resin Composition>

The rubber stopper for medical treatment of the invention can be obtained by molding a resin composition prepared by mixing the above-mentioned respective components at a predetermined ratio, into a predetermined shape.

The method for obtaining the resin composition concerned in the invention is not particularly limited with the proviso that the material components are uniformly dispersed. That is, a resin composition in which respective components are uniformly distributed can be obtained by mixing the above-mentioned respective material components and the like simultaneously or in an optional order.

Also included in the resin composition concerned in the invention is a state in which the aforementioned respective material components are dry-blended as such, and a rubber stopper for medical treatment may be obtained by molding this, but it is desirable to prepare a resin composition by melt mixing the aforementioned respective material components in advance in order to make further uniform mixing and dispersion. As the method of fusion mixing, for example, respective material components and the like of the resin composition concerned in the invention may be mixed in an optional order and then heated, all material components and the like may be mixed while melting in order, or a mixture of respective material components and the like may be pelletized or melt mixed at the time of molding in producing the molded product of interest.

The mixing method and mixing conditions in mixing the aforementioned respective material components are not particularly limited with the condition that respective material components and the like are uniformly mixed, but from the viewpoint of productivity, a commonly known melt kneading method, such as a continuous kneader such as single screw extruder and twin screw extruder, a batch type kneader such as mill roll, Banbury mixer (registered trademark), press kneader and the like, is desirable. The temperature at the time of melt kneading may be any temperature at which at least one of respective material components becomes a melted state, but a temperature at which all of the components to be used are melted is generally selected and this is generally carried out at from 150° C. to 250° C. in most case.

The resin composition to be used in the rubber stopper production of the invention is flexible and its moldability is good.

MFR of the resin composition to be used in the production of the rubber stopper for medical treatment of the invention, when measured at 230° C. under a load of 2.16 kg in accordance with the Test Condition 4 of JIS K7210 (1999), is preferably large from the viewpoint of moldability but is preferably small in view of mechanical strength. Illustratively, MFR of the resin composition at 230° C. under a load of 2.16 kg is preferably 0.01 g/10 min or more and further preferably 0.1 g/10 min or more, and on the other hand, 100 g/10 min or less is preferable and 50 g/10 min or less is more preferable.

<Rubber Stopper for Medical Treatment>

The rubber stopper for medical treatment of the invention can be obtained by molding the above-mentioned resin composition into a rubber stopper shape. The rubber stopper for medical treatment of the invention may have any shape with the proviso that the liquid leakage sealing property can be expressed.

The rubber stopper for medical treatment concerned in an invention among the invention is characterized in that the resin composition constituting the rubber stopper for medical treatment has a specific molecular weight distribution.

Illustratively, the aforementioned resin composition has at least one of one or more peaks and peak shoulders respectively within the ranges of the following (A-1) and (A-2), on the styrene basis molecular weight by GPC analysis. Further desirably, it has at least one of one or more peaks and peak shoulders respectively within the ranges of the following (A-1), (A-2) and (A-3), and most desirably, it has at least one of one or more peaks and peak shoulders respectively within the ranges of the following (A-1) to (A-4).

(A-1) molecular weight: from 250,000 to 350,000
(A-2) molecular weight: from 100,000 to 150,000
(A-3) molecular weight: from 400,000 to 550,000
(A-4) molecular weight: from 150,000 to 250,000

In this connection, regarding the (A-4) molecular weight, it does not include boundary molecular weight with (A-1) and boundary molecular weight with (A-2). That is, (A-4) molecular weight means exceeding 150,000 and less than 250,000.

In this case, measuring conditions of GPC to be used in carrying out measurement and peak separation of molecular weight distribution (number/mass average molecular weight) and interpretation of peak shoulder are as described in the foregoing. In this connection, when the aforementioned resin composition contains a component which is insoluble in chloroform as the solvent of GPC measurement, the measurement is carried out using a solution after filtration of the insoluble component.

In addition, it is desirable that peak signal intensity ratio of a peak presenting within the range of (A-1) and a peak presenting within the range of (A-2) obtained by isolating by the Gauss-Newton method is from 25/75 to 95/5, more desirably from 25/75 to 90/10 and further desirably from 25/75 to 85/15.

According to the invention, there is no limitation on the means for obtaining such a case that the aforementioned resin composition has at least one of specific peaks and peak shoulders within the molecular weight ranges of the aforementioned (A-1) to (A-4), and it can be achieved by optimizing molecular weights of at least one component or more of the component (A), component (B) and component (C) or optimizing the blending composition. Particularly, it is desirable to attain it by optimizing molecular weight distribution of the component (A), and it can be attained by optimizing the production conditions of the component (A) by the aforementioned production method or it can be achieved by optionally selecting a (hydrogenated) block copolymer from a commercial items and using it. In addition, it can also be achieved by optionally blending and using two or more of manufactured products and commercial items.

Particularly, rather than preparing a resin composition by using two or more (hydrogenated) block copolymers having different molecular weight distributions and blending them with the component (B) and component (C), it is desirable to prepare a resin composition by obtaining the component (A) as a (hydrogenated) block copolymer having two or more peaks by the GPC analysis as described in the foregoing and then blending this with the component (B) and component (C).

It is desirable that the rubber stopper for medical treatment of the invention is flexible. Illustratively, it is desirable that the duro A hardness (type A durometer hardness) measured in accordance with JIS K6253 (1993) is preferably 60 or less, further preferably 50 or less. In this connection, as the lower limit of duro A hardness, it is desirable to regard 10 as the lower limit value from the viewpoint of tackiness generation.

The rubber stopper for medical treatment of the invention has no limitation regarding its illustrative application in using the rubber stopper for medical treatment, but due to easy needle pricking and good liquid leakage sealing property, it is desirable when used as a rubber stopper for infusion bag or a rubber stopper for vial, and particularly, it is desirable when used as a rubber stopper for infusion bag.

<Production Method of Rubber Stopper for Medical Treatment>

The production method of rubber stopper for medical treatment of the invention has no particular limitation with the proviso that it can be molded into such a shape that the sealing property can be expressed. Illustratively, injection molding, compression molding, punching molding from extrusion molding and the like can be mentioned, but among these, injection molding or compression molding is desirable when molding cycle and mass productivity are taken into consideration.

From the viewpoint of hardly causing poor appearance due to surface precipitation of unmelted substances and the like, the temperature of cylinders and dies at the time of molding is preferably a high temperature, further preferably a higher temperature than the melting point of a component having most high melting point among the components contained in the melting resin, particularly preferably higher than the melting point of the component having most high melting point by a factor of 10° C. or more, most preferably higher than the melting point of the component having most high melting point by a factor of 20° C. or more.

Illustratively, since melting point of the component (A) is generally from 160° C. to 240° C., the temperature of cylinders and dies in molding the rubber stopper for medical treatment is preferably 170° C. or more, further preferably 190° C. or more and particularly preferably 200° C. or more. On the other hand, in order to prevent discoloration and physical property reduction by thermal degradation of the contained components, it is desirable that the temperature of the cylinders and dies at the time of molding is low. Upper limit of the temperature of the cylinders and dies at the time of molding is preferably 250° C. or less and further preferably 240° C. or less.

In addition, the mold temperature when injection molding is carried out is preferably 60° C. or less and further preferably 45° C. or less.

<Infusion Bag>

The infusion bag having the rubber stopper for medical treatment of the invention is not limited regarding its shape, structure, material quality and the like but is generally constituted from the main body of the infusion bag, a port for injecting a drug liquid, a rubber stopper, a cap and the like.

Shape of the rubber stopper of the infusion bag is not limited, but there may be mentioned, roughly, a truncated cone shape, a columnar shape, a disc shape and the like, and its diameter is generally approximately from 10 mm to 20 mm. Thickness of the rubber stopper of the infusion bag (thickness of the direction of penetrating injection needle) is not limited, too, but is generally approximately from 4 mm to 8 mm. In general, a rubber stopper made of a thermoplastic elastomer, to be used in an infusion bag, should be thickened in order to ensure liquid leakage sealing property, but it cannot be thickened from the viewpoint of penetration characteristics. However, since the rubber stopper for medical treatment of the invention is excellent in both liquid leakage sealing property and penetration characteristics, it can be suitable used in the infusion bag even when its thickness is set to 8 mm or more.

When the contents of the infusion bag having the rubber stopper for medical treatment of the invention are pulled out, an injection needle made of a metal may be used, an injection needle made of a plastic may be used or an injection needle made of other material may be used. In addition, diameter of the injection needle to be used is not limited, too. Further, a tool other than injection needles may be used, too.

In general, the liquid leakage sealing property becomes poor when an injection needle having a large bore diameter is used, but since the rubber stopper for medical treatment of the invention has good liquid leakage sealing property, an injection needle having an outer diameter of 2 mm or more, further 3 mm or more, can be used. In addition, in general, the penetration characteristics also become worse when a plastic injection needle is used, but since the rubber stopper for medical treatment of the invention has good penetration characteristics, it can be applied also to an infusion bag which uses a plastic injection needle.

EXAMPLES

The following describes the invention further in detail using examples, but the invention is not restricted by the following examples without exceeding its scope.

The following materials were used in the examples and comparative examples of the invention. Also, details of the component (A) used in the invention are shown in Table 1. In this connection measuring conditions of GPC are as described in the foregoing.

<Component (A)>

(a-1) "SEPTON KL-J3341" manufactured by KURARAY CO., LTD.: a styrene-isoprene-butadiene-styrene hydrogenated block copolymer. Has the structure of the aforementioned formula (1).

The styrene (block P) content: 41% by weight ($^{13}$C-NMR measured value), 1,4-microstructure ratio of isoprene: 94%, 1,4-microstructure ratio of butadiene: 93%, mass average molecular weight: 337,000, number average molecular weight: 230,000.

(a-2) "SEPTON 4077" manufactured by KURARAY CO., LTD.: a styrene-isoprene-butadiene-styrene hydrogenated block copolymer. Has the structure of the aforementioned formula (1).

The styrene (block P) content: 30% by weight ($^{13}$C-NMR measured value), 1,4-microstructure ratio of isoprene: 94%, 1,4-microstructure ratio of butadiene: 93%, mass average molecular weight: 381,000, number average molecular weight: 290,000.

(a-3) "KRATON G1633EU" manufactured by Shell Chemical Co., Ltd.: a styrene-butadiene-styrene hydrogenated block copolymer. Has the structure of the aforementioned formula (1).
The styrene (block P) content: 30% by weight ($^{13}$C-NMR measured value), 1,4-microstructure ratio of butadiene: 70%, mass average molecular weight: 380,000, number average molecular weight: 290,000.

(a-4) "SEPTON S2063" manufactured by KURARAY CO., LTD.: a styrene-isoprene-styrene hydrogenated block copolymer. Has the structure of the aforementioned formula (1).
The styrene (block P) content: 13% by weight (catalog value), 1,4-microstructure ratio of isoprene: 100%, mass average molecular weight: 105,000, number average molecular weight: 49,000.

(a-5) "KRATON G1654HU" manufactured by Shell Chemical Co., Ltd.: a styrene-butadiene-styrene hydrogenated block copolymer. Has the structure of the aforementioned formula (1).
The styrene (block P) content: 30% by weight ($^{13}$C-NMR measured value), 1,4-microstructure ratio of butadiene: 70%, mass average molecular weight: 180,000, number average molecular weight: 150,000.

(a-6) "SEPTON S4055" manufactured by KURARAY CO., LTD.: a styrene-isoprene-butadiene-styrene hydrogenated block copolymer. Has the structure of the aforementioned formula (1).
The styrene (block P) content: 30% by weight ($^{13}$C-NMR measured value), 1,4-microstructure ratio of isoprene: 100%, mass average molecular weight: 288,000, number average molecular weight: 210,000.

Examples 1 to 6

Comparative Examples 1 to 5

Production of Resin Compositions

Based on the blending ratios (part by weight) shown in Table 2, pellets of resin compositions were obtained by carrying out melt kneading at a setting temperature of 180° C. by a twin screw extruder ("TEX-30αII" manufactured by The Japan Steel Works, LTD., Cylinder bore diameter: 30 mm).

In this connection, two species of component (A) were used in Examples 2 and 4 to 6 and Comparative Example 3, and [A-1/A-2] signal intensity ratio of the GPC separation peaks as the mixed component (A) is shown in Table 2.

In addition, GPC measurement was carried out similar to the case of component (A) using the resin compositions obtained in the above, but on each of the resin compositions of the Examples and Comparative Examples, results of the components dissolved in chloroform as the measuring solvent were almost the same as the measured results by GPC in Table 1 and Table 2.

[Melt Flow Rate (MFR)]

The MFR of the resin compositions obtained by melt kneading was measured under a load of 230° C., 21 N (2.16 kgf) or 230° C., 49 N (5 kgf) in conformity to JIS K7210 (1999), with the results shown in Table 2.

<Production of Molded Articles>

Using the pellets of resin compositions obtained in the above, a plate of 80 mm×120 mm×2 mm was molded using an injection molding machine ("IS-130t" manufactured by TOSHIBA MACHINE CO., LTD.), and test pieces for physical property evaluation and characteristics evaluation of rubber stopper for medial treatment were stamped out therefrom. Conditions of the injection molding were set as resin temperature: from 180° C. to 240° C., injection time: from 2

TABLE 1

|  |  | a-1 | a-2 | a-3 | a-4 | a-5 | a-6 |
|---|---|---|---|---|---|---|---|
| Mass average molecular weight (Mw) | | 337,000 | 381,000 | 443,000 | 101,000 | 180,000 | 288,000 |
| Number average molecular weight (Mn) | | 230,000 | 290,000 | 320,000 | 49,000 | 150,000 | 210,000 |
| Molecular weight distribution (PDI) | | 1.5 | 1.3 | 1.4 | 2.1 | 1.2 | 1.4 |
| GPC peak numbers | | 2 | 1 | 1 | 1 | 1 | 1 |
| Molecular weight of GPC peaks | | 323,000 | 290,000 | 320,000 | 49,000 | 150,000 | 210,000 |
| | | 116,000 | — | — | — | — | — |
| Molecular weights of GPC separation peaks | (A-1) range | 323,000 | 290,000 | 320,000 | — | — | — |
| | (A-2) range | 116,000 | — | — | — | 150,000 | — |
| | (A-3) range | 483,000 | — | — | — | — | — |
| | (A-4) range | 218,000 | — | — | — | — | 210,000 |
| [A-1/A-2] signal intensity ratio of separation peaks | | 75/25 | 100/0 | 100/0 | — | 0/100 | — |

<Component (B)>
(b-1) "PW-90" manufactured by Idemitsu Kosan Co., Ltd.: paraffin-based process oil.

<Component (C)>
(c-1) "NOVATEC PP MA1Q" manufactured by JAPAN POLYPROPYLENE CORPORATION: a polypropylene homopolymer. MFR (230° C., 2.16 kg) 22 g/10 min.
(c-2) "NOVATEC PP FA3KM" manufactured by JAPAN POLYPROPYLENE CORPORATION: a polypropylene homopolymer. MFR (230° C., 2.16 kg) 12 g/10 min.

<Other Component>
(d-1) "Yukalite A-1" manufactured by Maruo Co., Ltd.: calcium carbonate.

seconds to 20 seconds, mold temperature: from 20° C. to 60° C. and cooling time: from 10 seconds to 40 seconds.

<Evaluation of Molded Articles>

[Duro A Hardness]

Using the plates obtained by carrying out injection molding as described in the above, this was measured in accordance with JIS K6253 (1993), with the results shown in Table 2.

[Tensile Characteristics]

In accordance with JIS K6251 (2004), No. 3 dumbbell test pieces obtained by stamping out the plates obtained by carrying out injection molding were strained at a rate of 500 mm/min using an autograph to measure elongation percentage until break (tensile elongation percentage) and strength at the time of the break (tensile breaking strength). In addition, the stress when 100% of the elongation percentage was shown (100% modulus) and the stress when 300% of the elongation percentage was shown (300% modulus) were also measured. The results are shown in Table 2.

[Compression Permanent Set]

In accordance with JIS K6262 (2006), test pieces having a diameter of 29 mm obtained by stamping out the plates obtained by carrying out injection molding were compressed using an exclusive jig, and heat treatment was carried out using a gear oven maintained at 70° C. After 22 hours thereof, the test pieces were released from the compression by pulling out them from the exclusive jig and recovery of their thickness was measured. The results are shown in Table 2.

displacement quality (penetration elongation) until its penetration (the needle penetrates the test pieces) were measured using an autograph. In this connection, it is desirable that the penetration resistance and penetration elongation are low. The results are shown in Table 3.

[Liquid Leakage Sealing Property Evaluation (1)]

Using a plate obtained by carrying out injection molding, test pieces of 20 mm in diameter were stamped out, and three sheets thereof were piled up and attached to the mouth stopper part of a commercially available 500 ml capacity PET drinking bottle filled with 500 ml of water. In order to prevent liquid leakage from between the test piece and PET bottle, an exclusive use jig was attached to the mouth stopper part, and the PET bottle was arranged by electing it.

TABLE 2

|  |  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|
| Blending ratio (weight part) | a-1 | 40 | 20 | 40 | 16 | — | — | — | — | — | — | — |
|  | a-2 | — | — | — | — | — | — | 40 | — | — | — | — |
|  | a-3 | — | 20 | — | — | 27 | 20 | — | 40 | 36 | 40 | — |
|  | a-4 | — | — | — | — | — | — | — | — | 11 | — | — |
|  | a-5 | — | — | — | 24 | 13 | 20 | — | — | — | — | — |
|  | a-6 | — | — | — | — | — | — | — | — | — | — | 40 |
|  | b-1 | 60 | 60 | 60 | 60 | 60 | 40 | 60 | 60 | 53 | 60 | 60 |
|  | c-1 | 11 | 10 | — | — | — | — | 7 | 6.5 | 7.5 | — | — |
|  | c-2 | — | — | 9 | 9 | 8 | 7.5 | — | — | — | 9 | 9 |
|  | d-1 | — | 12 | — | — | — | — | — | — | — | — | — |
| [A-1/A-2] signal intensity ratio of separation peaks |  | 75/25 | 88/12 | 75/25 | 30/70 | 75/25 | 50/50 | 100/0 | 100/0 | 100/0 | 100/0 | — |
| MFR | (230° C., 21N) [g/10 min] | 5.6 | 1.5 | 2.1 | 3.2 | 0.5 | — | — | — | — | — | — |
|  | (230° C., 49N) [g/10 min] | — | — | 42.8 | — | 12.8 | 17.9 | 3.5 | 6.6 | 47.6 | 13 | 7.7 |
| Duro A hardness |  | 40 | 46 | 35 | 36 | 41 | 36 | 34 | 33 | 33 | 37 | 38 |
| Compression permanent set (70° C., 22 h) [%] |  | 48 | 47 | 46 | 49 | 44 | 40 | 39 | 35 | 49 | 35 | 45 |
| Tensile characteristics | Tensile elongation percentage [%] | 540 | 860 | 840 | 890 | 990 | 730 | 1050 | >950 | 1010 | 980 | 1000 |
|  | 100% modulus [MPa] | 0.7 | 0.9 | 0.6 | 0.7 | 0.6 | 0.6 | 0.5 | 0.4 | 0.5 | 0.5 | 0.7 |
|  | 300% modulus [MPa] | 1.5 | 1.4 | 1.3 | 1.4 | 1.1 | 1.2 | 0.8 | 0.8 | 1.0 | 1.2 | 1.1 |
|  | Tensile breaking strength [MPa] | 2.9 | 6.3 | 4.9 | 6.5 | 8.2 | 4.1 | 7.3 | >5.8 | 5.7 | 9.6 | 8.2 |

<Performance Evaluation of Rubber Stopper for Medical Treatment (A)>

In this evaluation, plates obtained by carrying out injection molding of the resin compositions of Examples 1 and 2 and Comparative Examples 1 to 3 were piled up to obtain the same shape of the rubber stopper for medical treatment, and the characteristics required for the rubber stopper for medical treatment were evaluated by the following methods.

[Penetration Characteristic Evaluation (1)]

Using a plate obtained by carrying out injection molding, test pieces of 28 mm in diameter were stamped out, and three sheets thereof were piled up and attached to the jig shown in FIG. 1. Next, a plastic needle of 4 mm in diameter (manufactured by TERUMO CORP.) was inserted at a rate of 200 mm/min, and the maximum load (penetration resistance) and Next, a plastic needle having a diameter of 4 mm (manufactured by TERUMO CORP.) was inserted into this test piece with a hand from the vertical upper direction to the different level part where diameter of the needle becomes 6 mm, and the returned amount when the hand was freed was evaluated as the kick back quantity. Also, the bottle was allowed to stand under this condition for 3 hours and then inverted just after pulling out the plastic needle, and whether or not continued dripping is generated was verified and, at the same time, amount of water dripped in 1 minute (liquid leakage quantity) was measured. In this connection, it is desirable that the continuous dripping is not present and liquid leakage quantity and kick back quantity are less. The results are shown in Table 3.

TABLE 3

|  |  | Example 1 | Example 2 | Comparative Example 1 | Comparative Example 2 | Comparative Example 3 |
|---|---|---|---|---|---|---|
| Blending ratio (weight part) | a-1 | 40 | 20 | — | — | — |
|  | a-2 | — | — | 40 | — | — |
|  | a-3 | — | 20 | — | 40 | 36 |
|  | a-4 | — | — | — | — | 11 |
|  | b-1 | 60 | 60 | 60 | 60 | 53 |
|  | c-1 | 11 | 10 | 7 | 6.5 | 7.5 |
|  | d-1 | — | 12 | — | — | — |
| [A-1/A-2] signal intensity ratio of separation peaks |  | 75/25 | 88/12 | 100/0 | 100/0 | 100/0 |
| Penetration characteristics evaluation (1) | Penetration resistance [kgf] | 4.5 | 5.5 | 8.1 | 9.5 | 7.2 |
|  | Penetration elongation [mm] | 12.4 | 12.6 | 21.0 | 20.1 | 17.8 |
| Liquid leakage characteristics evaluation (1) | Liquid leakage quantity [ml] | 0.63 | 0.43 | 0.89 | 0.41 | 0.63 |
|  | Continuous dripping | no | no | no | no | present |
|  | Kick back quantity [mm] | 2.3 | 2.2 | 8.8 | 8.5 | 6.5 |

<Performance Evaluation of Rubber Stopper for Medical Treatment (B)>

In this evaluation, the resin compositions of Examples 3 to 6 and Comparative Examples 4 and 5 were made into the shape of rubber stopper for medical treatment by being subjected to injection molding under the following conditions, and the characteristics required for the rubber stopper for medical treatment were evaluated by the following methods. In this connection, in comparison with the evaluation (A), the evaluation (B) is a more realistic performance evaluation as the rubber stopper for medical treatment.

Regarding molding of the rubber stopper, a plate of 100 mm×100 mm×6 mm was molded using an injection molding machine ("IS-100t" manufactured by TOSHIBA MACHINE CO., LTD.), and test pieces having a predetermined shape were obtained by stamping them out from this. Conditions of the injection molding were set as resin temperature: from 180° C. to 240° C., injection time: from 2 seconds to 20 seconds, mold temperature: from 20° C. to 40° C. and cooling time: from 10 seconds to 40 seconds.

The rubber stopper for medical treatment was obtained by stamping out a test piece of 19 mm in diameter from the plate injection-molded as described in the foregoing and building it into an outer stopper of 18.5 mm in inner diameter.

[Penetration Characteristic Evaluation (2)]

Into the rubber stopper for medical treatment obtained in the above, a plastic needle of 4 mm in diameter (manufactured by TERUMO CORP.) was inserted at a rate of 200 mm/min, and the maximum load (penetration resistance) and displacement quality (penetration elongation) until its penetration (the needle penetrates the test pieces) were measured using an autograph. In this connection, it is desirable that the penetration resistance and penetration elongation are low.

Further, based on the evaluation results of the penetration resistance and penetration elongation, penetration characteristic as the rubber stopper for medical treatment was judged by the following evaluation criteria. The results are shown in Table 4.
A: Particularly excellent.
B: No problem in case of actual use.
C: Not suited for actual use.

[Liquid Leakage Characteristic Evaluation (2)]

Heat sterilization treatment was applied to the rubber stopper for medical treatment obtained in the above under a condition of 110° C., 30 minutes. Thereafter, a 1000 ml capacity polyethylene terephthalate (PET) bottle for drinking was filled with 40 ml of water, the rubber stopper for medical treatment was attached to its mouth stopper part, a plastic needle having a diameter of 4 mm (manufactured by TERUMO CORP.) was inserted with a hand from the vertical upper direction into the different level part where diameter of the needle becomes 6 mm, and this was allowed to stand for 24 hours under inverted state. Thereafter, by pulling out the plastic needle, whether or not continued dripping is generated was verified, and amount of water dripped until it stopped (liquid leakage quantity) was measured. In this connection, it is desirable that there is no continuous dripping and amount of liquid-leaked water is less.

Further, based on the evaluation results of the liquid leakage quality and continuous dripping, liquid leakage characteristic as the rubber stopper for medical treatment was judged by the following evaluation criteria. The results are shown in Table 4.
A: Particularly excellent.
B: No problem in case of actual use.
C: Not suited for actual use.

TABLE 4

|  |  | Example 3 | Example 4 | Example 5 | Example 6 | Comp. Ex. 4 | Comp. Ex. 5 |
|---|---|---|---|---|---|---|---|
| Blending ratio (weight part) | a-1 | 40 | 16 | — | — | — | — |
|  | a-3 | — | — | 27 | 20 | 40 | — |
|  | a-5 | — | 24 | 13 | 20 | — | — |
|  | a-6 | — | — | — | — | — | 40 |
|  | b-1 | 60 | 60 | 60 | 40 | 60 | 60 |
|  | c-2 | 9 | 9 | 8 | 7.5 | 9 | 9 |
| [A-1/A-2] signal intensity ratio of separation peaks |  | 75/25 | 30/70 | 75/25 | 50/50 | 100/0 | — |
| Penetration | Penetration strength [kgf] | 34 | 38 | 52 | 61 | 52 | 38 |

TABLE 4-continued

| | | Example 3 | Example 4 | Example 5 | Example 6 | Comp. Ex. 4 | Comp. Ex. 5 |
|---|---|---|---|---|---|---|---|
| characteristic evaluation (2) | Penetration elongation [mm] | 13.9 | 15.5 | 20.2 | 21.5 | 17.5 | 19.4 |
| | judgment | A | A | B | B | B | B |
| Liquid leakage characteristic evaluation (2) | Liquid leakage quantity [ml] | 0 | 0 | 0 | 1.2 | 12.2 | 11.1 |
| | Continuous dripping | no | no | no | no | no | present |
| | judgment | A | A | A | B | C | C |
| Synthetic judgment | | A | A | B | B | C | C |

While the invention has been described in detail and with reference to specific embodiments thereof, it will be apparent to one skilled in the art that various changes and modifications can be made therein without departing from the spirit and scope thereof. This application is based on a Japanese patent application filed on Jun. 22, 2010 (Application No. 2010-141766), the contents thereof being incorporated herein by reference.

INDUSTRIAL APPLICABILITY

The rubber stopper for medical treatment of the invention has both markedly excellent penetration characteristic and liquid leakage sealing property, in comparison with the conventional rubber stopper for medical treatment produced from a thermoplastic elastomer, and is also superior in hygiene, moldability and recycling ability even in comparison with vulcanized rubber, so that its application to various rubber stoppers for medical treatment including infusion bags is expected.

DESCRIPTION OF THE REFERENCE NUMERALS

1 Jig for penetration characteristic evaluation
2 Plastic needle
3 Test peace

What is claimed is:

1. A rubber stopper for medical treatment, which is obtained by molding a resin composition containing
    component (A): at least one of a block copolymer having at least two of a polymer block P containing a vinyl aromatic compound as the core and at least one of a polymer block Q containing a conjugated diene as the core and a hydrogenated block copolymer obtained by hydrogenating the block copolymer,
    component (B): a hydrocarbon-based softening agent for rubbers, and
    component (C): a polyolefin-based resin, wherein
    containing amount of the component (C) in the resin composition is from 1 weight part to 45 weight parts based on 100 weight parts in total of from 5 weight parts to 95 weight parts of the component (A) and from 5 weight parts to 95 weight parts of the component (B), and
    the resin composition has one or more peaks or one or more peak shoulders within each of the ranges of
    (A-1) molecular weight: from 250,000 to 350,000;
    (A-2) molecular weight: from 100,000 to 150,000;
    (A-3) molecular weight: from 400,000 to 550,000 and
    (A-4) molecular weight: from 150,000 to 250,000
    on the styrene basis molecular weight by a gel permeation chromatography analysis.

2. A rubber stopper for medical treatment, which is obtained by molding a resin composition containing
    component (A): at least one of a block copolymer having at least two of a polymer block P containing a vinyl aromatic compound as the core and at least one of a polymer block Q containing a conjugated diene as the core and a hydrogenated block copolymer obtained by hydrogenating the block copolymer,
    component (B): a hydrocarbon-based softening agent for rubbers, and
    component (C): a polyolefin-based resin, wherein
    containing amount of the component (C) in the resin composition is from 1 weight part to 45 weight parts based on 100 weight parts in total of from 5 weight parts to 95 weight parts of the component (A) and from 5 weight parts to 95 weight parts of the component (B), and
    the component (A) has one or more peaks or one or more peak shoulders within each of the ranges of
    (A-1) molecular weight: from 250,000 to 350,000;
    (A-2) molecular weight: from 100,000 to 150,000;
    (A-3) molecular weight: from 400,000 to 550,000; and
    (A-4) molecular weight: from 150,000 to 250,000
    on the styrene basis molecular weight by a gel permeation chromatography analysis.

3. The rubber stopper for medical treatment as claimed in any one of claim 1 or 2, wherein a peak signal intensity ratio of a peak presenting within the range of (A-1) and a peak presenting within the range of (A-2) obtained by peak separation, [A-1/A-2], is from 25/75 to 95/5.

4. The rubber stopper for medical treatment as claimed in claim 1 or 2, wherein the component (A) contains 10% by weight or more of the polymer block P.

5. The rubber stopper for medical treatment as claimed in claim 1 or 2, wherein the polymer block Q contains isoprene as the conjugated diene and 1,4-addition structure of isoprene in the microstructure of polymer block Q is from 60% by weight to 100% by weight.

6. The rubber stopper for medical treatment as claimed in claim 1 or 2, wherein the component (B) contains one or more species selected from the group consisting of a paraffin-based oil, a naphthene-based oil and a carbon atom aromatic oil.

7. The rubber stopper for medical treatment as claimed in claim 1 or 2, wherein the component (C) is a peroxide resoluble type polyolefin-based resin.

8. The rubber stopper for medical treatment as claimed in claim 1 or 2, which is used for a plastic needle.

9. An infusion bag, which contains the rubber stopper for medical treatment as described in any one of claim 1 or 2.

* * * * *